United States Patent [19]

Keogh

[11] 4,369,331

[45] Jan. 18, 1983

[54] ETHYLENE POLYMER COMPOSITIONS STABILIZED AGAINST WATER TREEING BY AN ORGANO TITANATE; AND THE USE THEREOF AS INSULATION ABOUT ELECTRICAL CONDUCTORS

[75] Inventor: Michael J. Keogh, Bridgewater, N.J.

[73] Assignee: Union Carbide Corporation, Danbury, Conn.

[21] Appl. No.: 218,794

[22] Filed: Dec. 22, 1980

[51] Int. Cl.$^3$ .......................... C08K 5/05; H01B 3/30; H01B 7/00

[52] U.S. Cl. ...................... 174/110 PM; 174/110 SR; 428/389; 524/333; 524/398

[58] Field of Search ........................... 525/4; 428/389; 174/110 SR, 110 PM; 260/45.75 F; 524/333, 398

[56] References Cited

U.S. PATENT DOCUMENTS

| | | | |
|---|---|---|---|
| 2,549,940 | 4/1951 | Kignaigo | 260/89.1 |
| 2,720,468 | 10/1955 | Shacklett | 117/34 |
| 2,917,414 | 12/1959 | McLean | 117/221 |
| 2,984,641 | 5/1961 | Wolinski | 525/4 |
| 3,103,490 | 9/1963 | Green | 252/15 |
| 3,418,348 | 12/1968 | Shepard et al. | 260/429.5 |
| 3,491,075 | 1/1970 | Dekking | 260/87.3 |
| 3,923,731 | 12/1975 | MacKenzie, Jr. | 260/42.29 |
| 4,020,214 | 4/1977 | MacKenzie, Jr. | 428/389 |
| 4,029,830 | 6/1977 | Yamamoto et al. | 427/57 |
| 4,172,189 | 10/1979 | Muller et al. | 525/330 |
| 4,206,260 | 6/1980 | McMahon | 428/379 |
| 4,299,713 | 11/1981 | Maringer et al. | 174/110 SR |

*Primary Examiner*—Stanford M. Levin
*Attorney, Agent, or Firm*—James C. Arvantes; Robert C. Brown

[57] ABSTRACT

The disclosure of this application is directed to a composition, devoid of added mineral filler, comprising an ethylene polymer and an organo titanate as a water treeing inhibitor. The compositions can be extruded about electrical conductors providing insulation thereon which is resistant to deterioration in the presence of moisture and an electrical field.

12 Claims, No Drawings

ETHYLENE POLYMER COMPOSITIONS STABILIZED AGAINST WATER TREEING BY AN ORGANO TITANATE; AND THE USE THEREOF AS INSULATION ABOUT ELECTRICAL CONDUCTORS

SUMMARY OF THE INVENTION

This invention relates to ethylene polymer compositions devoid of added mineral fillers, which are stabilized against water treeing by an organo titanate. The compositions of this invention are particularly useful as extrudates about electrical conductors to provide insulation thereon which is resistant to deterioration in the presence of moisture and an electrical field, as evidenced by resistance to water treeing.

BACKGROUND OF THE INVENTION

Ethylene polymers have been modified by the addition thereto of mineral fillers and organo silanes for the purpose of providing compositions which have improved resistivity to moisture and consequently improved electrical properties as disclosed in U.S. Pat. No. 3,957,719 granted May 18, 1976. For example, organo silanes such as vinyl tris(2-methoxyethoxy) silane have been added to polyethylene compositions containing clay and the resultant compositions suggested for use as insulation about electrical cables. Such compositions, however, have been found deficient when used as insulation about cables carrying high voltage current, on the order of at least five kilovolts. In such cases, it has been found necessary to subject the compositions to a prolonged heat treatment in order that the resultant insulated cables have an acceptable low power factor.

Compositions have also been formulated based on ethylene polymers, mineral fillers and organo titanates and used as insulation about electrical conductors as disclosed in U.S. Pat. No. 4,020,214 granted Apr. 26, 1977. An ethylene polymer composition containing a mineral filler and an organo titanate has not been found acceptable for use as insulation about electrical conductors carrying high voltage current as such composition impairs the transmission efficiency of the insulated electrical conductor.

DESCRIPTION OF THE INVENTION

The present invention provides compositions, based on ethylene polymers, which can be successfully used as insulation about conductors carrying high voltage current without the necessity of subjecting the compositions to a subsequent heating step in order that the resultant insulated, electrical conductors have an acceptable low power factor. In addition, the compositions of this invention have improved resistivity to water treeing and retain this resistivity, as manifested by good insulating qualities over prolonged periods of time. Also, the compositions of this invention, when used as insulation about electrical conductors, such as copper wires and cables, are relatively free of points of high electrical stress, found in systems containing mineral fillers. Points of high electrical stress are due to the agglomeration of mineral fillers. Furthermore, electrical conductors insulated with the compositions of the present invention are characterized by improved transmission efficiency.

Compositions comprising an ethylene polymer and an organo titanate are also characterized by additional advantageous properties. For example, the organo titanates will undergo hydrolysis and form alcohols. These alcohols, in turn, also function as water tree growth inhibitors in the ethylene compositions. In effect, the organotitanates, properly selected for hydrolysis rate, will serve as a "contact tablet" for slow release of a water tree growth inhibitor. Ethylene polymer compositions containing organo titanates and used as insulation about electrical conductors have extended work life due to the excellent compatability of the polymer with the organo titanate and negligible tendency of the titanate to volatilize.

The compositions of this invention are devoid of mineral fillers and comprise an ethylene polymer and an organo titanate wherein the organo titanate is present in an amount sufficient to improve the water treeing resistance thereof. Generally, the organo titanate is present in an amount of about 0.1 to about 5 percent by weight, preferably in an amount of about 0.5 to about 2 percent by weight based on the weight of the ethylene polymer.

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage,

These other interpolymerizable compounds may be α-olefins such as, butene-1, pentene-1, octene-1 and the like. Vinyl compounds, such as vinyl acetate and ethyl acrylate may also be interpolymerized with ethylene up to a maximum content of about 5 percent by weight.

Preferred copolymers are ethylene/ethyl acrylate copolymers, ethylene/propylene copolymers, ethylene/butene copolymers and the like.

Also included in the term polymer are blends of one polymer with one or more other polymers. Illustrative of such blends are polyethylene with polypropylene, low-density polyethylene with high-density polyethylene, and polyethylene with olefin copolymers such as these indicated above.

The low-density ethylene copolymers with α-olefins may be made under low pressure conditions of about 150 to 300 psi with supported chromium oxide based catalysts that are modified with titanium and optionally, fluorine, as disclosed in U.S. Pat. Nos. 3,666,736 and 4,011,382. The disclosures of these patents are included herein by reference.

Suitable ethylene polymers have a density (ASTM 1505 test procedure with conditioning as in ASTM D-1248-72) of about 0.86 to 0.96 grams/cubic centimeter and a Melt Index (ASTM D-1238 at 44 psi test pressure) of about 0.1 to 10 decigrams per minute.

Illustrative of organo titanates suitable for purposes of the present invention are those falling within the scope of Formula I:

$$Ti(OR)_4 \qquad \text{Formula I}$$

wherein each R, which can be the same or different, is hydrogen or a hydrocarbon radical having one to 24 carbon atoms inclusive, preferably one to 14 carbon atoms inclusive. By definition of an organo titanate at least one R is a hydrocarbon radical.

Exemplary of suitable hydrocarbon radicals are alkyl radicals such as methyl, ethyl, n-propyl, isopropyl, butyl, octyl, lauryl, myristyl, stearyl and the like, cycloaliphatic radicals such as cyclopentyl, cyclohexyl and the like, aryl radicals such as phenyl, methylphenyl, and the like; alkaryl radicals such as benzyl and the like.

Particularly desirable titanates falling within the scope of Formula I are those wherein each R is alkyl having one to 24 carbon atoms inclusive, preferably one to 14 carbon atoms inclusive, exemplified by tetrabutyl titanate, tetraisopropyl titanate and the like.

Organo titanates falling within the scope of Formula I are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

In addition to the ethylene polymer and the organo titanate, the compositions of the present invention can also contain crosslinking agents when the composition is to be chemically crosslinked. These chemical vulcanizing, curing or crosslinking agents are well known to those in the art and include the organic peroxide type of crosslinking agents which are disclosed for example, in U.S. Pat. Nos. 2,826,570, 2,888,424, 2,916,471, 3,079,370 and 3,296,189, the disclosures of these patents being incorporated herein by reference. The chemical crosslinking agents may be used individually or in combination with one another, and they are used in crosslinking amounts. The preferred crosslinking agent is a di-α-cumyl peroxide.

The compositions of the present invention can also include one or more suitable high temperature antioxidants for the ethylene polymer in such compositions. The antioxidants include sterically hindered phenols or amines, polymerized 2,2,4-trimethyl dihydroquinoline, thiodiethylene-bis(3,5-ditert-butyl-4-hydroxy) hydrocinnamate, distearylthiodiproprionate and the like.

Other additives which can be employed in the compositions of the present invention would include additives commonly employed in ethylene polymer based dielectric compositions, including lubricants, oil extenders, dyes and colorants and metal deactivators.

The compositions of the present invention can also be extended with polymers, other than the ethylene polymer, which are compatible, i.e., can be physically blended or alloyed, or grafted, with the ethylene polymer. The resultant compositions should contain at least about 30 weight percent of interpolymerized ethylene in all the polymers that may be present in the composition, based on the total weight of the resultant composition. The other polymers which can be used include polypropylene, rubbers or elastomers such as styrene-butadiene block copolymers, urethane elastomers, polyester elastomers, natural rubber and the like.

The total amount of additives used will range from 0 to about 60 weight percent, preferably 0 to 10 weight percent based on the total weight of the composition.

The following examples further illustrate the present invention and are not intended to limit the scope thereof in any manner.

Compositions were formulated, tested and rated for WTGR (Water Tree Growth Resistance) against a relative WTGR of 1.0 for a Control.

The water tree growth resistance of a composition containing a commercial grade of polyethylene homopolymer having a Melt Index of 0.2 dg/minute and a density of 0.92 grams/cubic centimeter and 0.10 percent of 4, 4'thiobis(3-methyl-6-tert-butyl phenol) was determined by the procedure described in U.S. Pat. No. 4,212,756 granted Mar. 13, 1979 the disclosure of which is incorporated herein by reference. This composition had a relative value of 1.0 for water tree growth resistance.

A series of compositions were formulated and tested for WTGR. Each composition was prepared by admixing the ethylene polymer and organo titanate in a Brabender mixer at a temperature of 155° C. until homogeniety was reached. Once homogeniety was reached, a heat stabilizer was added to the composition and mixing continued to a homogeneous mixture. Contents of the Brabender were discharged and stored under argon until tested for water treeing growth resistance (WTGR) as described in U.S. Pat. No. 4,212,756.

| FORMULATION: | COMPOSITIONS PERCENT BY WEIGHT | | | |
|---|---|---|---|---|
| | A | B | C | D |
| Polyethylene Melt Index 0.2 dg/min Density 0.92 grams/cc | 98.9 | 98.9 | 98.9 | 98.9 |
| 4,4'-thiobis(3-methyl-6-tert-butyl phenol) (heat stabilizer) | 0.1 | 0.1 | 0.1 | 0.1 |
| Tetraoctylene glycol titanium chelate | 1.0 | — | — | — |
| Isopropyl tri-(lauryl-myristyl)titanate | — | 1.0 | — | — |
| Tetra-stearyl titanate | — | — | 1.0 | — |
| Tetrakis-(2-ethyl hexyl) titanate | — | — | — | 1.0 |
| WTGR | 0.173 | 0.189 | 0.435 | 0.358 |

What is claimed is:

1. A water treeing resistant, crosslinkable composition, devoid of added mineral filler, comprising an ethylene polymer, a heat stabilizer, an organic peroxide and a hydrolyzable organo titanate having the formula:

$$Ti(OR)_4$$

wherein R is hydrogen or a hydrocarbon radical, with at least one R being a hydrocarbon radical, said hydrolyzable organo titanate being present in an amount sufficient to improve the water treeing resistance of said composition.

2. A composition as defined in claim 1 wherein the organo titanate is present in an amount of about 0.5 to about 2 percent by weight.

3. A composition as defined in claim 1 wherein each R is a hydrocarbon radical.

4. A composition as defined in claim 3 wherein each R is alkyl.

5. A composition as defined in claim 3 wherein the organo titanate is isopropyl tri(lauryl-myristyl) titanate.

6. A composition as defined in claim 3 wherein the organo titanate is tetra-stearyl titanate.

7. A composition as defined in claim 3 wherein the organo titanate is tetrakis-(2-ethyl hexyl) titanate.

8. The crosslinked product of the composition defined in claim 1.

9. A composition as defined in claim 1 wherein the ethylene polymer is polyethylene.

10. A composition as defined in claim 1 wherein said heat stabilizer is 4,4'-thiobis(3-methyl-6-tert-butyl phenol).

11. A composition as defined in claim 1 wherein the organo titanate is present in an amount of about 0.1 to about 5 percent by weight based on the weight of said polymer.

12. An electrical conductor insulated with the cured product of the composition defined in claim 1.

* * * * *